No. 885,296. PATENTED APR. 21, 1908.
E. RIVETT.
SPEED CHANGING MECHANISM.
APPLICATION FILED AUG. 26, 1904.
3 SHEETS—SHEET 1.
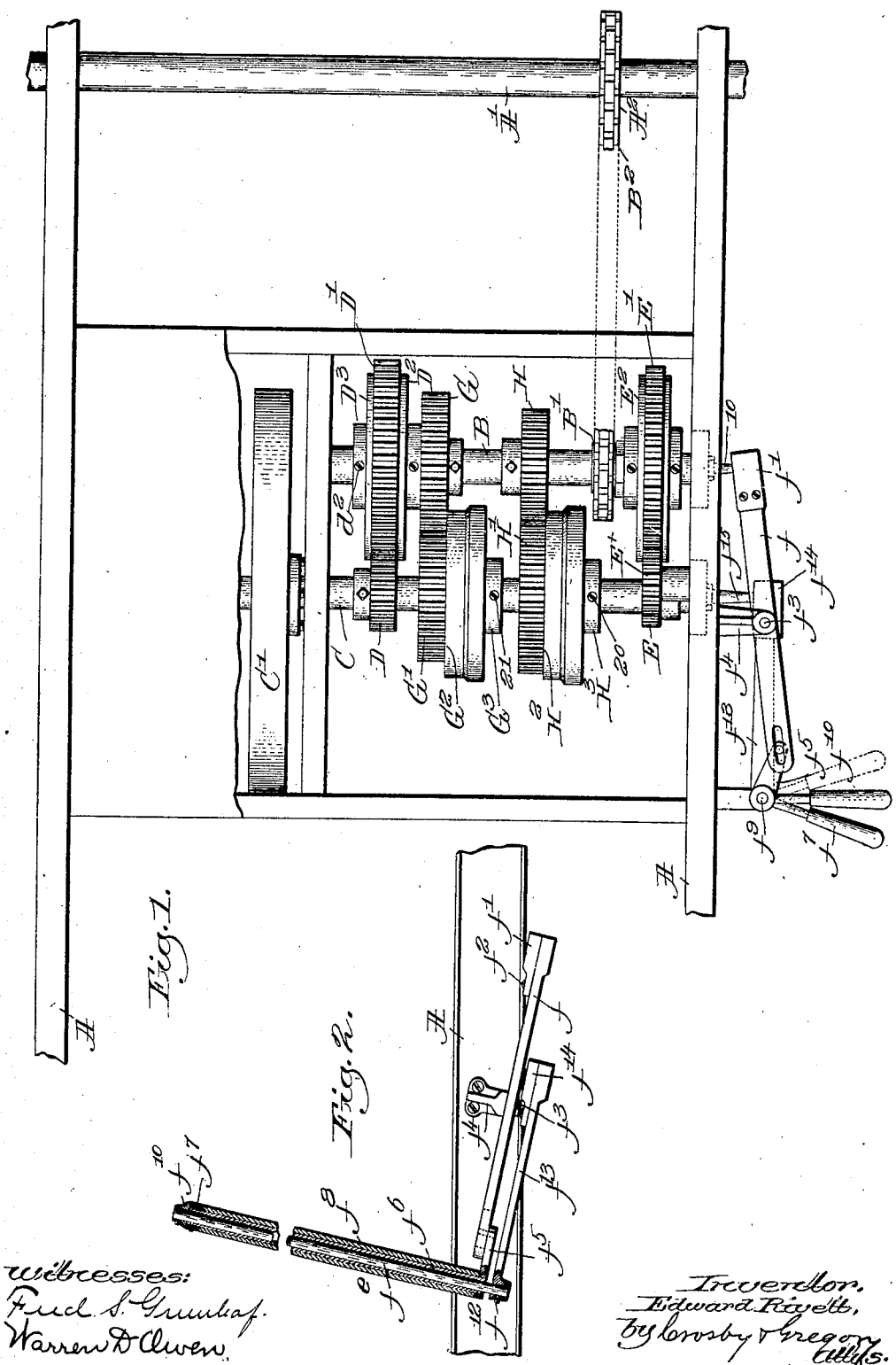

No. 885,296. PATENTED APR. 21, 1908.
E. RIVETT.
SPEED CHANGING MECHANISM.
APPLICATION FILED AUG. 26, 1904.
3 SHEETS—SHEET 2.
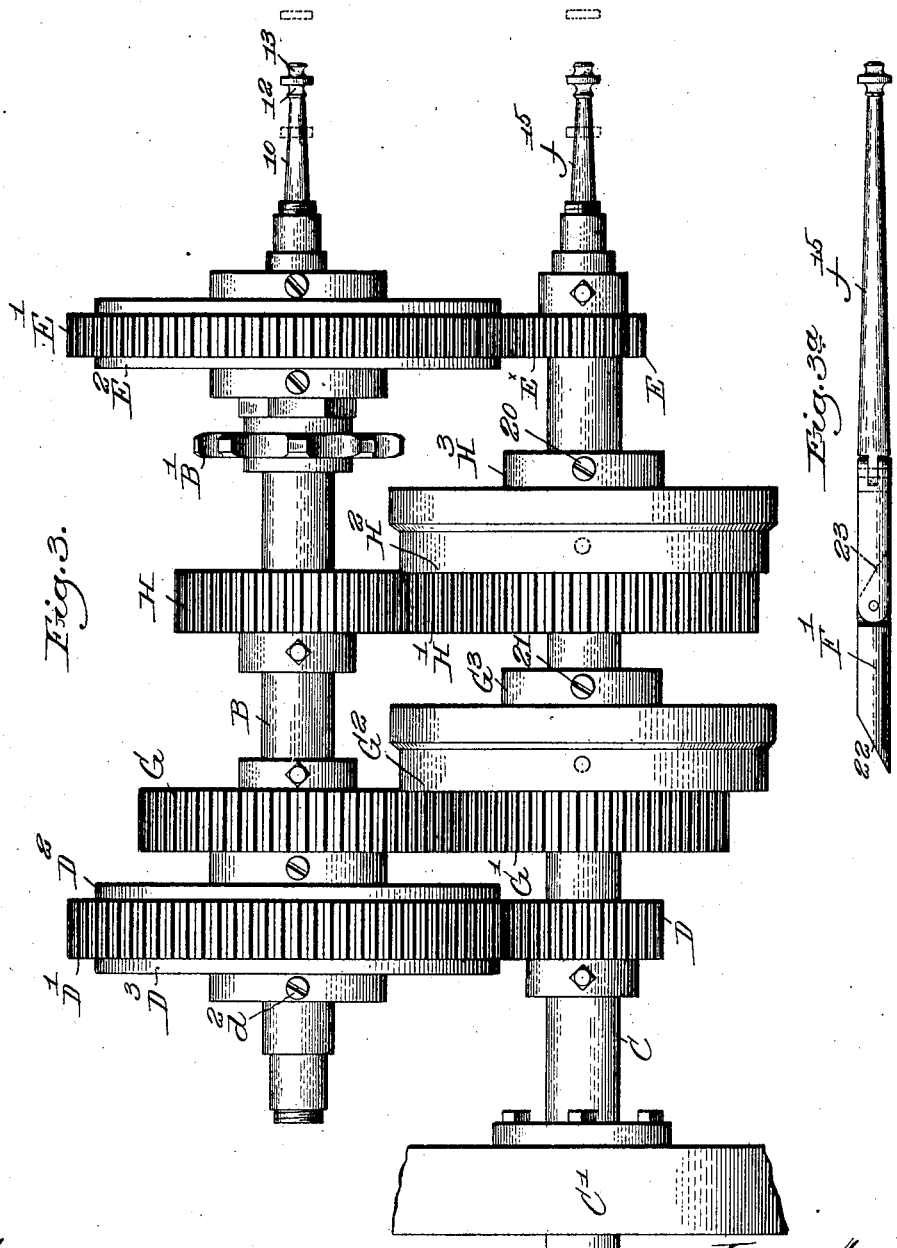

No. 885,296.
PATENTED APR. 21, 1908.
E. RIVETT.
SPEED CHANGING MECHANISM.
APPLICATION FILED AUG. 26, 1904.
3 SHEETS—SHEET 3.
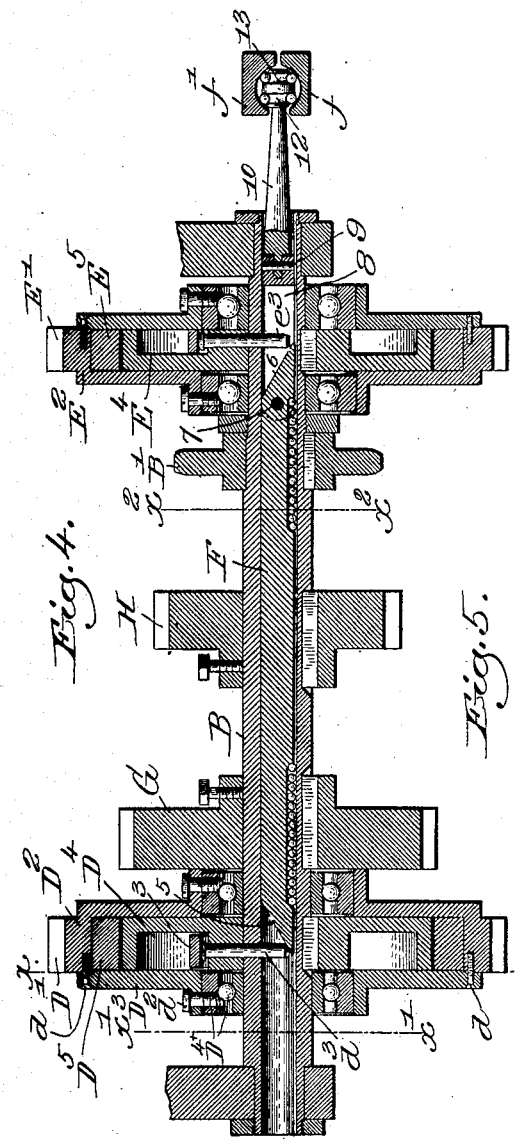
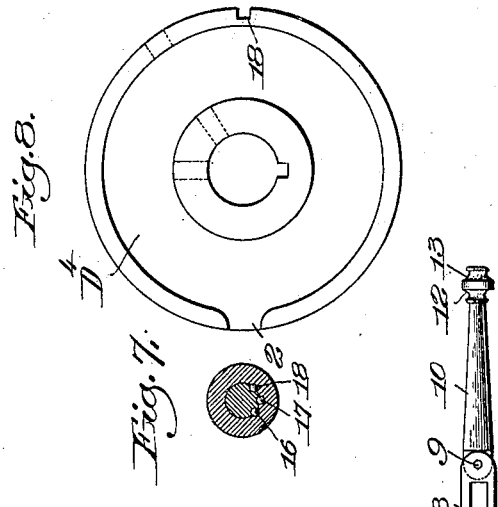
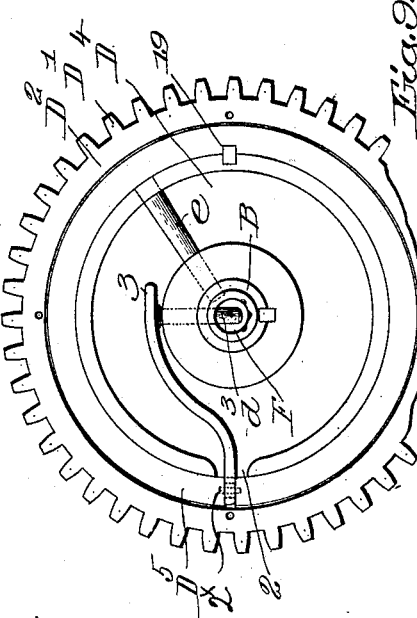
Witnesses:
Fred S. Greenleaf.
Warren D. Owen.
Inventor.
Edward Rivett,
by Crosby & Gregory
Attys.

UNITED STATES PATENT OFFICE.

EDWARD RIVETT, OF BOSTON, MASSACHUSETTS.

SPEED-CHANGING MECHANISM.

No. 885,296.  Specification of Letters Patent.  Patented April 21, 1908.

Application filed August 26, 1904. Serial No. 222,225.

*To all whom it may concern:*

Be it known that I, EDWARD RIVETT, a citizen of the United States, and a resident of Boston, in the county of Suffolk and State of Massachusetts, have invented an Improvement in Speed - Changing Mechanism, of which the following description, in connection with the accompanying drawing, is a specification, like letters on the drawings representing like parts.

This invention, relating to speed-changing mechanism, has for its object the production of a very simple, durable and easily controlled mechanism whereby the article or thing to be moved may be started and moved easily either in a forward or in a backward direction, the direction of movement being under the control of the manipulator of the speed-changing mechanism, either direction succeeding the other at will.

The mechanism is so constructed as to move a driven shaft forward at preferably its slow speed, and backwardly at will, also at its slow speed, the mechanism containing devices to increase the forward movement of the driven shaft at a high speed or to an intermediate slow speed.

My novel speed-changing mechanism is of that class wherein a clutch is depended upon to start the driven shaft, and my invention includes the employment of a plurality of loose gears having attached toothed wheels which, when engaged with a driving shaft or member by suitable clutches will cause the driven shaft to be rotated at different forward speeds and at a slow backward speed.

The engagement of one or the other of the loose gears referred to, controls the speed of rotation of said driven shaft, and change in the direction of movement or speed is effected by a draw-bar having a plurality of inclines, each incline moving engaging means that causes one or the other clutch to engage one or the other of the loose gears and makes that particular gear effective as a driver for the article or thing to be moved.

Preferably the inclines on the draw-bar are in opposite directions so that when the draw bar is moved in one direction by a suitable manually controlled actuator, one speed for the driven shaft may be insured, and when moved in the opposite direction the same or a different speed may be insured.

Figure 1 in top view shows part of the frame of an automobile with my speed-changing mechanism applied in one simple form of my invention. Fig. 2 shows one form of manually controlled means for moving the draw bars, two being shown in the present embodiment of my invention. Fig. 3 is an enlarged plan view of the speed-changing mechanism of Fig. 1 detached from the frame work. Fig. 3ª shows the draw-bar used in the shaft C. Fig. 4 is a longitudianl section taken through the driving shaft. Fig. 5 is a view looking to the right of the section line $x$ Fig. 4, the cap being removed. Fig. 6 is a sectional detail taken to the right of the line $x'$. Fig. 7 is a sectional detail in the line $x^2$ looking to the right. Fig. 8 shows the holder which is surrounded by the clutch ring. Fig. 9 shows one of the draw bars detached.

I have chosen herein to illustrate my invention as applied to an automobile for driving the same forward at different speeds and backward at a slow speed; but I desire it to be understood that the invention is applicable to moving other things than an automobile wherein a backward and a forward motion is required, or wherein a backward and forward motion varying in speed is required, or wherein a backward motion and various different speeds of forward motion are desired.

Referring to the drawing, let A represent part of the axle-carrying framework of an automobile or other carriage, and A' one of the axles to which will be fixed in usual manner the driving wheels of the automobile, said shaft deriving its movement from what I shall hereinafter designate the driven shaft B, through any suitable devices herein represented as a sprocket wheel $A^2$ on the shaft A', a sprocket wheel B' on the shaft B, and a sprocket chain $B^2$. Instead, however, of the sprocket wheels and chain I may employ any other usual or suitable connection such as toothed wheels by which, when the driven shaft B is rotated, the wheel-carrying shaft will be turned thereby.

The driving shaft C sustained in any suitable bearings on the framework, will be rotated by the usual motor devices of the automobile, either an engine, electric motor, or other usual means. This shaft has a flywheel C' and it is also, in the present embodiment of my invention, shown as provided with two pinions, D and E, said pinions of suitable diameter being shown herein as of substantially the same diameter, the pinion D engaging the teeth D' of a gear D² herein shown as chambered on one side, said chamber having a cap D³ held in place by screws $d$. The hubs of the gear D², and the cap D³ receive like anti-friction bearings D⁴ˣ comprising rings and intermediate balls so that the outermost rings of each bearing is held in place by suitable screws $d^2$ which insures an anti-friction support for the gear. All of the gears used will be supported in like manner so need not be herein further described.

The driven shaft B is parallel to the driving shaft C, and both of these shafts are hollow as represented by the shaft B in Fig. 4. The shaft B within the toothed gears D² and E² has fixed to it by like taper pins $e$, shown only in Fig. 5, two hubs D⁴ and E⁴, each hub being chambered as herein shown at its outer face, and the exterior of each hub has a like opening 2 leading into said chamber. In these chambers I locate the tail end of clutch engaging means 3 shown as a bent arm slotted at its end, see dotted lines Fig. 5, to receive a stud or pin 2ˣ extended therein loosely from one end of one of the clutch rings D⁵, E⁵, said pins aiding in guiding the acting ends of the engaging device $d$ in their movement between the ends of the clutch-ring. The hubs D⁴, E⁴, next the shaft have respectively pins $d^3$, $e^3$, both alike, that extend through holes in the shaft B, said pins being adapted to be moved outwardly by a draw-bar F, to be described, causing the heads thereof, acting upon the tail ends of the engaging devices 3, to move said devices and cause the ends thereof occupying a position between the ends of the clutch rings, to expand said rings so that the exterior surfaces thereof will grip the inner surfaces of the gears D² or E², whichever clutch-ring is to be actuated, and thereafter cause the engaged gear to be moved positively with the shaft.

The draw-bar F, shown in Fig. 4, has two inclines, 5, 6; one incline, 5, serving to move the pin $d^3$ and cause the gear D² to be coupled with said shaft, the other incline 6 serving to move the pin $e^3$ and clutch the gear E² with, and to be moved by, the shaft B.

Viewing Fig. 4 it will be understood that if the draw-bar is moved to the left, the incline 5 will act upon the pin $d^3$, pushing the same outwardly and cause the gear D² to be clutched to, and moved by, the driven shaft, said gear being the one employed when it is desired to turn the wheel-carrying shaft A' forwardly at a slow speed.

It will be noticed that the toothed wheel E does not engage directly the teeth E' of the gear E², but first engages an intermediate Eˣ sustained on a suitable stud carried by the framework, and said intermediate engages the teeth E' of the wheel E², and consequently when the draw-bar, Fig. 4, is moved to the right the incline 6 raises the pin $e^3$ and effects the engagement of the rim E² with the shaft B, but through the intermediate the shaft B is turned in the opposite direction which will rotate the shaft A' of the automobile backwardly, and as shown the gear E² is of substantially the same size as the gear D², and the automobile will be run backwardly at what is herein designated the "slow speed".

As herein represented the driven-shaft B has fixed thereon two toothed wheels G, H, the one H being of smaller diameter and forming part of the driving train for the fastest speed that the shaft A' is to be turned. The gear G is of larger diameter than the gear H and is one of the train of gears for imparting to the shaft A', or other thing to be moved, an intermediate speed or a speed between the slow speed and the fastest speed.

The gear H engages the teeth H' of and drives the gear H². The gear H² encircles the larger portion of a hub H³ fixed to the shaft C by a screw 20, and between the larger part of this hub and the interior of the gear H² there is a clamping-ring like the rings D⁵ and E⁵. The wheel G engages the teeth G' fixed to one side of the gear G², it in turn embracing loosely the larger part of a hub G³, fast to the shaft C, by a set screw 21, said hub G³ being embraced by a clamping-ring in all essential particulars the same as the clamping-rings D⁵ and E⁵. Each of the clamping-rings carried by the hubs H³ and G³ is adapted to be expanded to grip loosely the gears H² and G² by devices such as represented and described for expanding the clamping-rings carried by the shaft B, and these devices are moved to clutch either the gears H² or G² to the shaft C by moving a draw-bar F' shown separately in Fig. 3ᵃ, either one or the other of said gears being clutched to said shaft C at will, that depending upon the direction of movement of the draw-bar.

The draw-bar, Fig. 3ᵃ, used in the shaft C, differs from the draw-bar in the shaft B only in that the inclines 22 and 23 are not separated as far from each other as represented in Fig. 4.

It will be understood that whenever the draw-bars stand in their normal positions, as represented in Fig. 4, in either shaft, B or C, the respective loose gears are inoperative.

Each draw-bar, in the form in which I have herein chosen to illustrate the same, has jointed thereto, near one end thereof, by a pin, as 7, a fork 8 with which in turn is jointed at 9 an arm 10, so shaped at its outer end as to present two annular grooves 12, 13, see Fig. 9, to receive a series of balls, the balls being embraced externally by the end of a lever $f$ having a cap $f'$ connected thereto by a screw $f^2$, the balls constituting an anti-friction device connecting the lever with the draw-bar. The lever $f$ is mounted to turn about a stud $f^3$ forming part of a bracket $f^4$ connected with a part of the framework of the automobile, the opposite end of the lever being slotted to embrace a pin carried by an arm $f^5$ extended from a hollow shaft $f^6$ having at its upper end a handle $f^7$. The hollow shaft is shown as inclosed in a tubular bearing $f^8$. The hollow shaft has extended through it a rod $f^9$ provided at its upper end with a handle $f^{10}$, and at its lower end said rod has connected with it by a screw $f^{12}$ an arm $f^{13}$ that has a cap $f^{14}$, the outer end of said arm and cap embracing the ball-shaped end of the link $f^{15}$, connected with the draw-bar contained in the shaft C.

The devices $f$ and $f^{13}$ constitute what I shall hereinafter designate as manually controlled actuating means for the draw-bars, and it will be understood that while said actuating means represents one good form for the purpose stated, this invention is not limited to the construction represented, as I consider that I am free to substitute any suitable means under the control of the hand of the chauffeur whereby the movement of the draw-bars, one or both, may be controlled and may be moved in either direction at will.

Each draw-bar has a plurality of longitudinal grooves shown best in Fig. 7, and the inner surface of each shaft B or C, has a longitudinal groove throughout its length, and in these grooves I apply a series of balls 16, 17 and 18, said balls sustaining the weight of the draw-bars and permitting them to be moved inside the shafts without undue friction, and inasmuch as the balls enter grooves in the shaft and draw-bar it follows that the draw-bars serve as keys to cause the rotation of the draw-bars with the shafts.

Each clutch-ring has a notch, see Fig. 5, and each hub has a notch 18, see Fig. 8, and when these notches are in line I insert a pin 19 therein, see Fig. 5, said pin serving to connect the clutch-ring to the hub.

From the foregoing description it will be understood that with the parts in the condition represented in Figs. 1 and 4, the shaft A' may be supposed to be at rest. To start the shaft forwardly at a slow speed the chauffeur will engage the handle $f^7$ and will pull it forwardly into the position shown in Fig. 1, such movement sliding the draw bar F to the left and causing the incline 5 to effect the coupling of the loose gear $D^2$ to the shaft B so that the pinion D of the driving shaft C will turn the gear $D^2$ and with it the shaft B causing the sprocket wheel B', acting through the chain $B^2$ on the sprocket wheel $A^2$ of the shaft A', to turn said shaft and move the automobile forwardly at its slow or starting speed. By turning the handle $f^7$ backwardly from the full line position, Fig. 1, into the dotted line position, the draw bar F will be moved in the shaft B to the right causing the incline 6 to act and couple the gear $E^2$ to the shaft B, and as that gear is being moved in an opposite direction, as represented by the arrow thereon, Fig. 3, through the intervention of the intermediate $E^\times$, it follows that the shaft A' will be turned backwardly at its slow speed.

It will be noticed that by moving the draw bar F in one or the other direction, the direction of movement of the automobile, either forwardly or backwardly, may be changed instantly and without engaging or disengaging any teeth, as is customary in all speed-changing mechanism in automobiles as now employed so far as I am aware; and it becomes possible, through the manually controlled means and the draw bar, each controlling two clutches, to move an automobile forward for any distance and immediately reverse its movement by but the slight movement of the manually controlled means.

In speed-changing mechanism having clutch teeth that are engaged and disengaged, one with the other, and especially as employed in automobiles, it is necessary to stop the wheel-carying shaft and arrest the movement of the automobile before it can be started forwardly after the automobile has been run backwardly, but by employing the draw-bar and friction mechanism as herein represented, it is not necessary to bring the automobile to rest, after it has been moved backwardly, before moving it forwardly, and there is no necessity of any appreciable period of time elapsing between the backward and forward movements, or vice versa.

The distance between the handles $f^7$ and $f^{10}$ is sufficient to enable the chauffeur to insert his hand between the handles.

To provide for ease of movement and pleasure of riding in an automobile, the automobile must be started at a slow speed to avoid shock both to the machinery and to the occupants, and when once started forwardly through the handle $f^7$ the chauffeur will put said handle in its natural position and will disengage the handle $f^{10}$, and through the arm $f^{13}$ move inwardly the draw-bar contained in the shaft C and will couple the gear $G^2$ to said shaft so that the next highest speed, herein designated the "intermediate speed," may be gained for the automobile, and the intermediate speed gained, the handle may be moved in the opposite direction to pull out the draw-bar from the shaft C which will immediately release the gear $G^2$ and couple the gear $H^2$ to the shaft C that the said gear may thereafter control the movement of the shaft A' of the automobile and drive the same forwardly at its highest speed. Of course it will be understood that having once started the automobile at its slow speed, the chauffeur may immediately couple the gear H² to the shaft C and immediately start the automobile at its highest speed without using the intermediate clutch. So, also, supposing an automobile is being run forwardly at either the intermediate or the highest speed, both of which speeds are controlled by one of the draw-bars, it will be understood that the chauffeur by moving the handle containing the draw-bar F may instantly throw into action the backwardly moving clutch, which will act as a brake to arrest the forward movement, and if the movement is not too rapid it is possible to stop and substantially immediately reverse the movement of the automobile. The provision of the two draw-bars used as described enables a machine to be stopped within a very small space, to be reversed, and to be again started without really stopping the machine.

Having described my invention, what I claim as new and desire to secure by Letters Patent is:—

1. In mechanism of the class described, the combination, with a machine frame, a shaft therein, a plurality of loose gears thereon, and co-acting clutches, of a draw-bar rotatable therewith and provided at its opposite ends with inclined surfaces, and a forked link jointed to and embracing one end of said draw-bar and extended through the frame, and means connected with said link to move said draw-bar in one or the opposite direction to clutch one or the other of said gears to the shaft which they surround.

2. In mechanism of the class described, the combination, with a machine frame, a hollow shaft, a plurality of gears loose thereon, and co-acting clutches, of a draw-bar provided with a plurality of inclines, a two-part link having its inner end forked and occupying at all times a position within one end of said hollow shaft and jointed to said draw-bar near one end, the outer end of said link being jointed to the forked end thereof, the outer end of said link being extended outside the frame, and means connected with said link to move said draw-bar in one or the opposite direction to clutch one or the other of said gears to the shaft which they surround.

3. In mechanism of the class described, the combination, with a machine frame, a hollow shaft, a plurality of gears loose thereon, and co-acting clutches, of a draw-bar provided with a plurality of inclines, a link jointed to one end of said draw-bar within one end of said hollow shaft, said link being extended through the frame, and a horizontally-arranged lever, and a vertical shaft, and means carried thereby to move said horizontal lever.

4. In apparatus of the class described, two parallel shafts gears fast thereon, a plurality of hubs on each shaft, gears surrounding loosely the hubs of both said shafts, clutching means carried by each hub, a draw-bar in each shaft, each draw-bar having a plurality of inclines oppositely directed, and means to move said draw-bars in one or the other direction to couple one or the other of said gears to one or the other of said shafts.

5. In apparatus of the class described, a rigid frame work, a wheel-shaft sustained therein, a sprocket-wheel thereon, a driven shaft, a sprocket-wheel thereon, a chain connecting said sprocket-wheels, a driving shaft and a driven shaft gears fast thereon, each of said shafts having hubs and loose gears surrounding said hubs, and clutching means between said hubs and gears, combined with two draw-bars provided with inclines for effecting the clutching of said loose gears to said hubs to rotate said driven shaft and revolve the wheel-carrying shaft.

6. In apparatus of the class described, two parallel hollow shafts gears fast thereon, a plurality of hubs on each of said shafts, gears surrounding loosely the hubs of both said shafts, clutching means co-acting with each hub, two draw-bars differing in length, one draw-bar in each of said hollow shafts, each draw-bar having a plurality of inclines oppositely directed, and means to move said draw-bars in one or the other direction to clutch one or the other of the hubs of said shafts.

7. In an automobile, a hollow driving, and a hollow driven shaft, a draw-bar in each of said shafts, each draw-bar having an inclined portion, toothed gears normally loose on each of said shafts, gears fast on each of said shafts and engaging the teeth respectively of the gears loose on the other of said shafts, one of said gears being capable of being turned forwardly at a fast speed, and the other backwardly at a slower speed, clutch members for each of said loose gears, and means to move either of said draw-bars to effect the clutching of each of said loose gears to the shaft surrounded by it.

In testimony whereof, I have signed my name to this specification, in the presence of two subscribing witnesses.

EDWARD RIVETT.

Witnesses:
GEO. W. GREGORY,
MARGARET A. DUNN.